No. 774,646. Patented November 8, 1904.

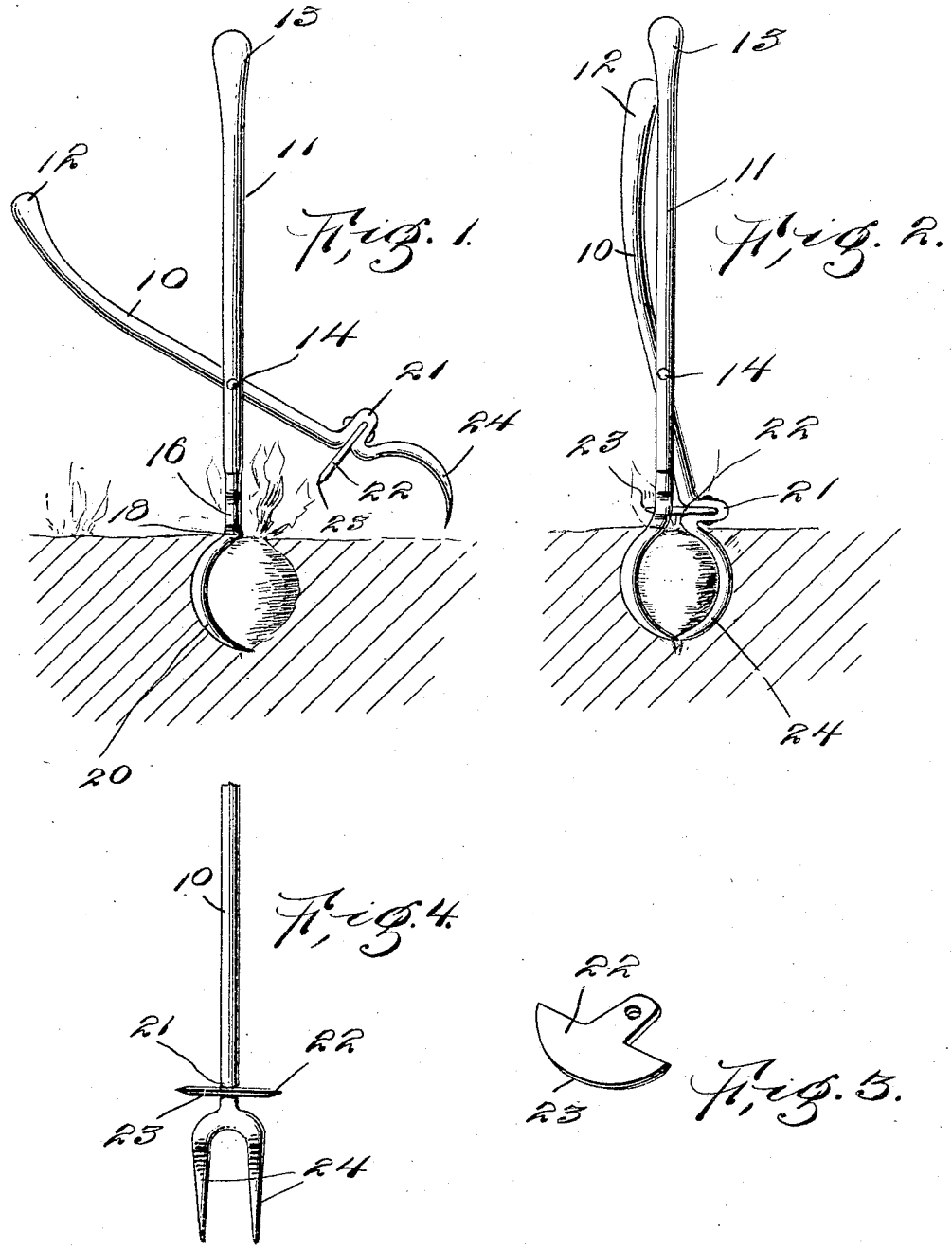

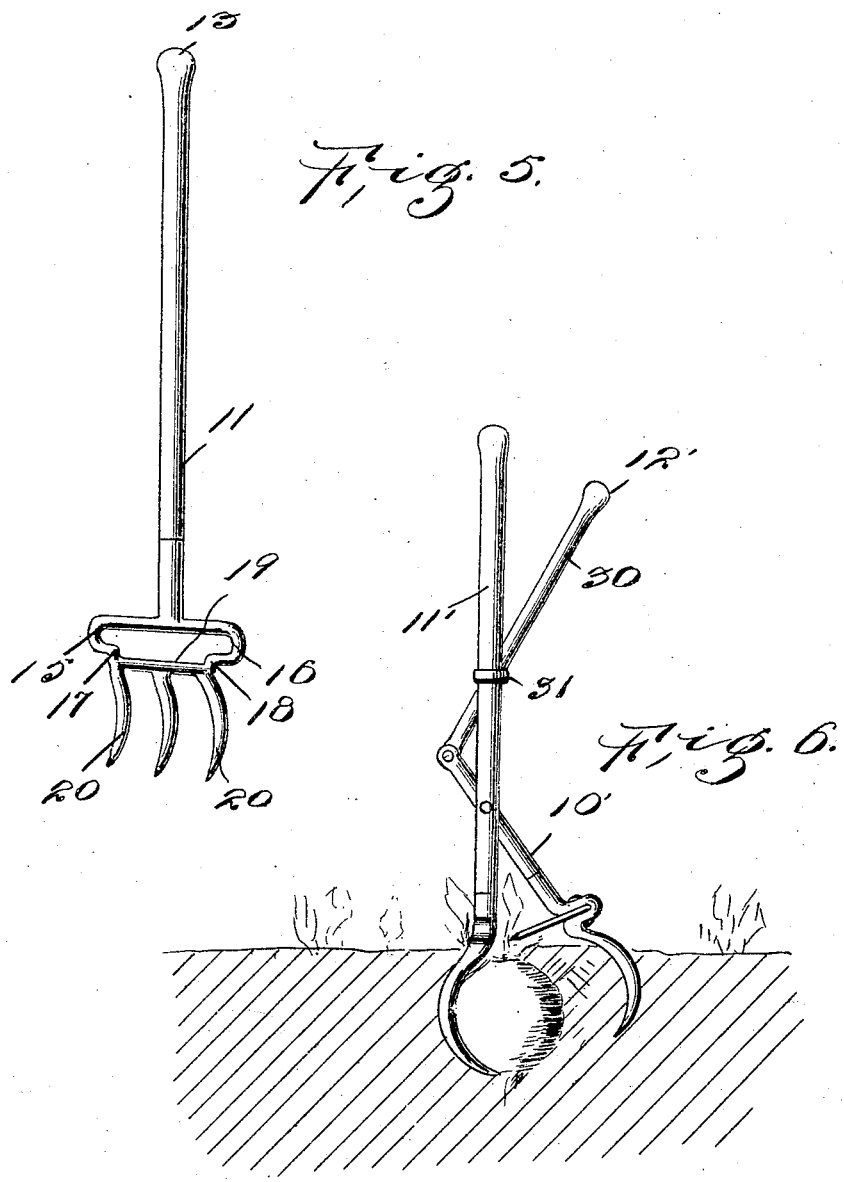

UNITED STATES PATENT OFFICE.

EBON O. CADY, OF AUBURNDALE, WISCONSIN.

BEET TOPPER AND PULLER.

SPECIFICATION forming part of Letters Patent No. 774,646, dated November 8, 1904.

Application filed April 22, 1904. Serial No. 204,457. (No model.)

*To all whom it may concern:*

Be it known that I, EBON O. CADY, a citizen of the United States, residing at Auburndale, in the county of Wood, State of Wisconsin, have invented certain new and useful Improvements in Beet Toppers and Pullers; and I do hereby declare the following to be a full, clear, and exact description of the invention, such as will enable others skilled in the art to which it appertains to make and use the same.

This invention relates to farm implements; and it has for its object to provide an implement or tool which may be operated to cut the tops from beets and subsequently pull the beets without further manipulating the tool other than to raise it.

A further object of the invention is to provide a tool which will be cheap and simple and efficient in its operation.

In the drawings forming a portion of this specification, and in which like numerals of reference indicate similar parts in the several views, Figure 1 is a side elevation showing the tool with the parts in position for engagement with a beet. Fig. 2 is a view similar to Fig. 1, showing the parts engaged with the beet ready for pulling, the top having been cut off. Fig. 3 is a detail view of the knife. Fig. 4 is an elevation of the knife-carrying member looking toward the edge of the knife. Fig. 5 is an elevation similar to Fig. 4, showing the fork-carrying member. Fig. 6 is a view similar to Fig. 1, illustrating a modified arrangement of the handles.

Referring now to the drawings, and more particularly to Figs. 1 to 5 thereof, inclusive, there is shown a tool comprising handle members 10 and 11, having grips 12 and 13, respectively, at their upper ends, the members 10 and 11 being crossed and connected by a pivot 14, so that they have the character of a pair of tongs.

At the lower end of the member 11, which is the fork-carrying member, is a yoke, the arms 15 and 16 of which are bowed outwardly in opposite directions and the extremities of which are bent to lie parallel, as shown at 17 and 18, and are secured to the head 19 of a fork comprising prongs 20, which are curved, as illustrated, so that they will conform generally to the contour of a beet.

The member 10 is the knife-carrying member, the lower end portion thereof having a lateral bend 21, to which is rigidly attached a knife 22, having a broadened cutting edge 23, said knife being so positioned that when the handles are brought together at their upper ends the cutting edge of the knife is passed between the outwardly curved or bowed portions 15 and 16 of the yoke at the lower end of the member 11.

At the extreme lower end of the member 10 are a pair of curved fingers 24.

In the use of the tool the fork is pressed into the ground at the side of the beet, and the grip 12 is moved toward the grip 13, so that the knife-edge 23 is engaged with the beet-top close to the body of the beet and cuts the top from the beet, continued movement of the parts serving to carry the fingers 24 with their lower ends beneath the beet and to clasp the beet between the fingers and the fork. The tool is then drawn upwardly, and the beet is drawn from the ground. By separating the grips 12 and 14 the fingers and fork are moved apart, and the beet is released.

In Fig. 6 of the drawings there is shown a construction similar to that above described, excepting that the member 10' is shorter than the member 10, to which it corresponds, and pivoted to its upper end is a rod 30, having a grip 12' at its upper extremity, the rod 30 having a loop 31, which is slidably engaged around the member 11', corresponding to the member 11. The knife is operated by pulling upwardly on the grip 12'.

It will be understood that in practice other modifications may be made and any suitable materials and proportions may be used for the various parts without departing from the spirit of the invention.

What is claimed is—

1. A tool of the class described comprising pivoted members one of which is provided with a fork and the other of which is provided with fingers movable toward and away from the fork to clasp a beet thereagainst and with a knife above the fingers and projecting laterally in advance of the fingers.

2. A tool of the class described comprising crossed and pivoted members, a fork at the lower end of one of the members, said member having a knife-receiving opening above the fork, fingers at the lower end of the opposite member disposed for movement therewith toward and away from the fork to clasp a beet thereagainst, and a knife carried by the second member projecting laterally therefrom in advance of the fingers and movable therewith through the opening of the first member.

3. A tool of the class described comprising pivoted members, a fork at the lower end of one of the members, fingers at the lower end of the second member and movable therewith toward and away from the fork, a knife carried by the second member and projecting laterally therefrom in advance of the fingers, a third member slidably connected with the first member and pivoted to the upper end of the second member, and grips at the upper ends of the first and third members.

In testimony whereof I affix my signature in presence of two witnesses.

EBON O. CADY.

Witnesses:
JACOB LUSK,
D. R. COON.